Patented June 28, 1938

2,121,952

UNITED STATES PATENT OFFICE 2,121,952

BLEACHING, WASHING, AND CLEANSING COMPOSITIONS

Herbert Colonius, Dusseldorf, and Friedrich Weldes, Dusseldorf-Benrath, Germany, assignors to Henkel & Cie G. m. b. H., Dusseldorf-Holthausen, Germany, a corporation of Germany No Drawing. Application March 30, 1935, Serial No. 13,932. In Germany March 31, 1934

10 Claims. (Cl. 8—2)

This invention relates to the stabilization of per salts and other per compounds constituting one component of treating agents of diverse nature such as, for example, bleaching, washing and cleansing compositions, especially those agents which contain one or more water soluble salts of pyrophosphoric acid or other similar phosphoric acids. It relates further to the resulting compositions of matter, which may contain in addition to the per compound, the phosphate and the stabilizing compound other substances such as soda and soap, and which are suitable for bleaching, cleaning, soaking, rinsing, penetrating, dissolving, scouring and other purposes, particularly for the treatment of textiles and other fibers in industrial processes and in the home.

Prior workers have proposed the use of pyrophosphates and per compounds of the nature of hydrogen peroxide and perborates, but such compounds decompose quickly and lose their effectiveness when used in aqueous alkaline solutions.

One object of the present invention is to provide a means, comprising a class of compounds, for stabilizing compositions of the above nature, or to provide a method of stabilizing such compositions by employing the novel class of compounds.

Another object of the invention is to provide stable compositions containing per compounds, which compositions are very effective for washing, cleansing, wetting, bleaching, scouring, rinsing and like purposes.

The present invention in its broadest aspects includes our discovery that difficultly soluble or substantially insoluble, colorless tin compounds have the quality of very effectively stabilizing alkaline solutions of the phosphate-per compound mixtures herein described, and of regulating the rate of oxygen liberation from such mixtures during use for bleaching, cleaning or other purposes.

The novel compositions which constitute one phase of the present invention broadly comprise mixtures of the following ingredients alone or in admixture with other substances to be hereinafter described; namely, an oxygen-liberating per compound, a water soluble salt of a phosphoric acid having a lower proportion of water molecules than orthophosphoric acid, a colorless, difficultly soluble tin compound, and if necessary to obtain a greater degree of alkalinity also a substance adapted to render an aqueous solution of the other ingredients of the composition more strongly alkaline.

As stated in the foregoing paragraph, the stabilization agents employed in accordance with the present invention are colorless, difficultly soluble tin compounds. These compounds are highly effective in preventing the dissociation of oxygen delivering per compounds and this we consider and believe to be our invention. Included among those tin compounds found suitable are the difficultly soluble stannates, particularly the stannates of the alkaline earth metals, such as of magnesium, calcium, strontium and barium; and also stannic acid itself. These stannates together with other similar tin-containing salts may be referred to generically as the alkaline earth salts of the tin acids. Instead of employing alkaline earth metal salts of tin acids, there may be used under special circumstances soluble tin salts from which the difficultly soluble tin compounds form during use; such soluble compounds being, for example, the alkali metal stannates of the nature of sodium stannate and potassium stannate. For convenience the alkaline earth metal salts, which become insoluble during use under conditions sometimes encountered, and the alkali metal salts may be referred to collectively as the alkaline salts. In the above tin compounds, the tin atom has been situated in the negative radical, but such position is not necessary in the broadest aspects of the present invention, for the tin atom may constitute the positive element of the compound, such for instance as in tin silicate.

The quantity of the difficultly soluble tin compound which is necessary to obtain the desired degree of stabilization is dependent on several factors including the particular per compound to be stabilized, and the nature and quantity of the other components of the composition. The amount of tin compound necessary for use in the herein described compositions may frequently be as small as 0.5 to 3% (calculated as $SnO_2$), such amount generally giving a result far superior to that obtained by prior stabilization compounds.

The per compounds suitable for the production of the compositions of the present invention are those which develop or liberate oxygen when dissolved in water, or those which have heretofore been employed or proposed for use as bleaching agents in industrial processes. Instead of using a single per compound, mixtures of the same may be used to advantage in many cases. Among the usable compounds are the alkali metal salts, particularly the sodium salts of per acids, as, for example, the perborates, percarbonates, perphosphates, persulfates, perpyrophosphates and simple salts and also, as well, hydrogen peroxide itself and its organic derivatives, such as the addition product of hydrogen peroxide and urea.

The phosphate salts constituting another component of the compositions of the present invention may be referred to collectively as the water soluble salts of those phosphoric acids which contain less water or a lower proportion of water molecules than orthophosphoric acid. More specifically the phosphoric acids of which the water soluble salts may be used include the pryophosphates, the metaphosphates and the polyphosphates, which salts may be employed in their monomeric or polymeric form, for example, as trimeric or hexameric phosphate. As additional examples mention may be made of calcined neutral sodium pyrophosphate and sodium metaphosphate containing water of crystallization, also trimeric and hexameric sodium metaphosphates, and the following polyphosphates; namely, $Na_5P_3O_{10}$, $Na_6P_4O_{13}$, $Na_9P_5O_{17}$, $Na_{12}P_{10}O_{31}$. Furthermore, the sub-phosphates, for example that having the formula $Na_4P_2O_6$, can be used with satisfactory stabilization effects.

The proportions of the foregoing ingredients in the present compositions may vary within wide limits. The phosphate salts and per compound mixtures of any practical proportions may be stabilized by the addition of the colorless, difficultly soluble tin compounds herein described. When the present compositions are to be used as washing and cleansing agents, it is usually desirable that the composition be employed in the presence of a substance adapted to render aqueous solutions of the same alkaline. In some cases sufficient alkalinity already exists and no additional alkaline substance is required. Where greater alkalinity is necessary there may be added one or more of the following alkaline substances given here only as examples without any intention of limitation thereto, the alkaline salts of the nature of water glass, alkali metal metasilicates, alkali metal carbonates, alkali metal borates, borax and the alkali metal orthophosphates.

In order to impart additional cleansing qualities to the compositions, any one or more of a number of saponaceous substances may be added. For example, soda soap, potassium soap, olive oil soap, saponine or other soap substitutes or soap-like compounds, as, for example, the alkali metal salts of sulfonated (including sulfated) oils or fatty alcohols or other capillary active compounds which contain in their molecules lipophile radicals of high molecular weight on the one hand and acid or other radicals adapted to impart water solubility on the other hand. As examples of sulfonated fatty alcohols there may be mentioned the alkali metal or other water soluble salts of sulfonates of the primary or secondary alcohols having from 12 to 18 carbon atoms, such as sodium lauryl sulfate or other alkali metal sulfates of myristyl, cetyl, oleyl and stearyl alcohols, which alcohols may be produced by the catalytic hydrogenation of carboxylic acids or by the controlled oxidation of paraffin hydrocarbons. Technical mixtures such as that produced from cocoanut oil may be used instead of the individual compounds.

The difficultly soluble colorless tin compounds have been found to exert a stabilizing effect on per compounds in the compositions as already described and as well when such compositions are employed in admixture with other known washing, cleansing, soaking, rinsing, penetrating, foaming, dissolving, scouring, wetting, emulsifying and superfatting agents, and the like.

The present invention is independent of any particular method by which the various ingredients may be compounded. They can be mixed or ground in any suitable apparatus and in any appropriate sequence. For instance, the per compounds may be initially mixed with the difficultly soluble tin compounds and then with the desired quantity of the herein mentioned phosphates or mixtures of the phosphates with the alkaline substances.

The present invention contemplates that the novel compositions may be manufactured and distributed in solid, or liquid or pasty form. They may be produced in the form of powders, granules, flakes, strips, pastes or in the form of solutions or emulsions in water or other organic or inorganic solvents. Instead of the compositions being prepared at the place of manufacture in the form in which they are to be used, they may be mixed wholly or in part at the place of use if for any reason such procedure is more advantageous. It is generally satisfactory, however, to prepare the compositions in the solid form at the place of manufacture, for the tin compound stabilization agent although existing in the solid state in the mass has a property of stabilizing the compositions during storage.

The washing and cleaning agents of the present invention may be employed in many branches of industry as well as in the home. They are particularly suitable for use in bleaching and washing textiles, clothes and other articles of commerce which become darkened or soiled with age.

*Example 1*

Seventeen parts of neutral sodium pyrophosphate, 13 parts of sodium borate, 3 parts of stannic acid, 15 parts of soda and 52 parts of soap, all by weight, are thoroughly mixed in a grinding mill. The resulting composition possesses excellent detergent properties and may be used successfully in the home and in commercial processes for washing textiles, clothes, and the like.

*Example 2*

Thirty-four parts of sodium pyrophosphate, 26 parts of sodium borate, 2 parts of calcium stannate and 38 parts of soda, all by weight, are thoroughly mixed in any suitable mixing apparatus. A cleansing agent is obtained which is excellently suitable for the bleaching of fibers in the textile industry. Solutions of this composition are especially distinguished by the fact that their bleaching action extends over a considerable period of time.

*Example 3*

Fifteen parts of the polyphosphate of soda having the formula $Na_6P_4O_{13}$, 10 parts of sodium perborate, 3 parts of stannic acid, 20 parts of soda and 52 parts of soap, all by weight, are ground into a homogeneous mixture. The resulting mixture has excellent detergent properties and is suitable for use in the textile industry as well as in commercial laundries or in the home. Instead of the polyphosphate mentioned, other polyphosphates may be employed, for example, such as those having the formula $Na_5P_3O_{10}$, $Na_9P_5O_{17}$, $Na_{12}P_{10}O_{31}$, and the like can be used with substantially equal results.

Example 4

Thirty parts of sodium metaphosphate, 28 parts of sodium perborate, 2 parts of magnesium stannate and 40 parts of soda, all by weight, are thoroughly stirred together until a homogeneous mixture is obtained. The resulting composition comprises a cleansing agent possessing a regulated bleaching action particularly suitable for employment in the textile industry.

Example 5

Sixteen parts of neutral sodium pyrophosphate, 10 parts of sodium perborate, 3 parts of stannic acid, 12 parts of soda and 25 parts of a technical mixture of sodium salts of sulfonated higher alcohols, all by weight, are thoroughly mixed in any suitable apparatus. An excellent detergent is obtained suitable for use in the home and in industrial processes for bleaching and washing clothes and other textile materials.

Example 6

Eighteen parts of a polyphosphate of the formula $Na_6P_4O_{13}$, 10 parts of sodium perborate, 3 parts of stannic acid, 10 parts of soda and 30 parts of the sodium salt of oleyl-methyl taurin, all by weight, are thoroughly mixed in a ball mill. The resulting composition comprises a detergent which may be used satisfactorily in laundries or in the home for washing textiles.

It should be understood that the present invention is not limited to the specific compounds or other details described in the specification, but that it includes all equivalent substances and steps within the general tenor of the specification and the scope of the appended claims. For instance the specific examples are not limited to the use of the particular per compounds mentioned therein, for any one or more of the other per compounds described in other parts of the specification may be substituted.

We claim:

1. A bleaching and cleansing composition comprising an aqueous alkaline solution containing an oxygen-liberating per compound, a water soluble salt of a phosphoric acid having a lower proportion of water molecules than orthophosphoric acid, said salt being present in an amount which enhances the cleansing powers of said composition, and a difficultly soluble, colorless tin compound.

2. The method of stabilizing bleaching and cleaning compositions composed of alkaline solutions of mixtures of oxygen-liberating per compounds with water soluble salts of phosphoric acids containing a lower proportion of molecular water than orthophosphoric acid comprising, adding to such solutions a small amount of a colorless, difficultly soluble tin compound.

3. The method of stabilizing and also regulating the rate of oxygen liberation from alkaline solutions of bleaching and cleaning mixtures composed of oxygen-liberating per compounds with water soluble salts of phosphoric acid containing a lower proportion of molecules of water than orthophosphoric acid comprising, adding to such solutions a small amount of a colorless, difficultly soluble salt of a tin acid.

4. A composition of matter adapted to form aqueous alkaline solutions suitable for bleaching, washing, cleansing or like purposes containing an oxygen-liberating per compound, a water soluble salt of a phosphoric acid having a lower proportion of molecules of water than phosphoric acid, a difficultly soluble, colorless tin compound, and a saponaceous substance, said phosphoric acid salt constituting a substantial proportion of said composition which enhances the cleansing powers thereof.

5. A bleaching and cleaning composition containing an oxygen-liberating per compound, a water soluble salt of a phosphoric acid having a lower proportion of water molecules than orthophosphoric acid, said salt being present in an amount which enhances the cleansing powers of said composition, an alkaline earth stannate, and an alkalinity-imparting substance.

6. A bleaching and cleaning composition comprising an aqueous alkaline solution containing an oxygen-liberating per compound, a water soluble salt of a phosphoric acid having a lower proportion of water molecules than orthophosphoric acid and a difficultly soluble tin compound, said phosphoric acid salt constituting a substantial proportion of said composition which enhances the cleansing powers thereof.

7. A bleaching and cleaning composition containing an oxygen-liberating per compound, a water soluble pyrophosphate in an amount adapted to enhance the cleansing powers of said composition, a difficultly soluble salt of a tin acid and an alkalinity-imparting substance.

8. A composition of matter containing a per compound capable of liberating oxygen when in aqueous solution, a water soluble salt of a phosphoric acid having a lower proportion of water molecules than orthophosphoric acid, a difficultly soluble, colorless tin compound, a substance adapted to impart alkalinity to the composition when in aqueous solution, and a water soluble salt of a sulfonated higher alcohol.

9. A bleaching and cleaning composition adapted to form aqueous alkaline solutions, comprising an oxygen-liberating per compound, an alkali metal salt of tetra-phosphoric acid, a difficultly soluble, colorless tin compound and a saponaceous substance.

10. A bleaching and cleaning composition adapted to form aqueous alkaline solutions, comprising an oxygen-liberating per compound, an alkali metal salt of tetra-phosphoric acid, a difficultly soluble, colorless tin compound and a water soluble salt of a sulfonated higher alcohol.

HERBERT COLONIUS.
FRIEDRICH WELDES.